Figure 6:
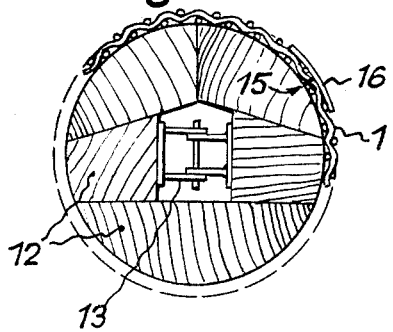

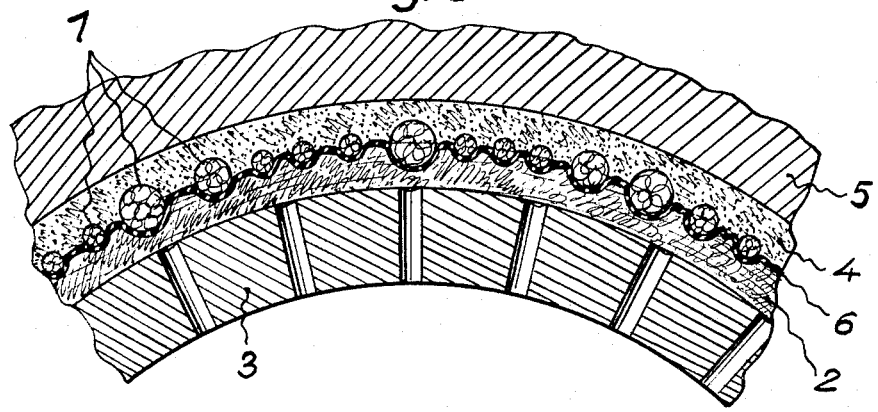
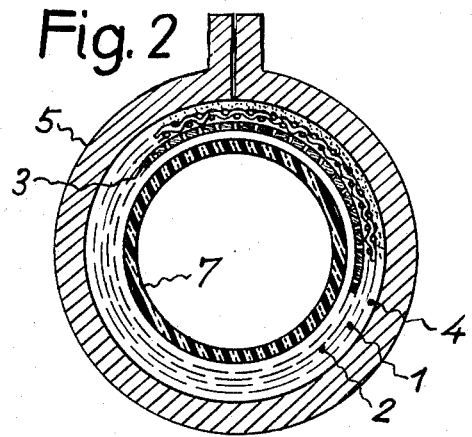
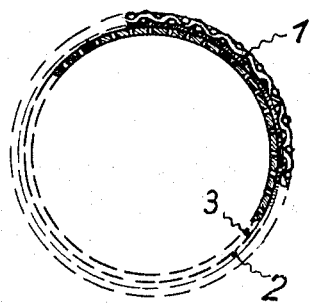
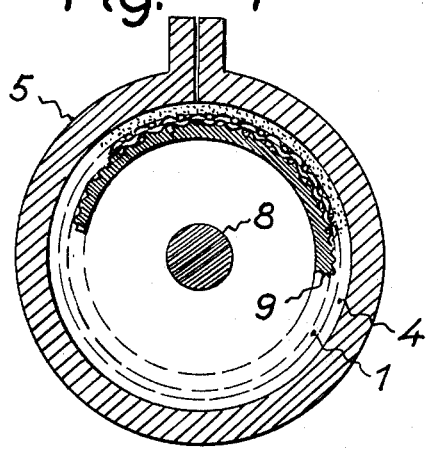
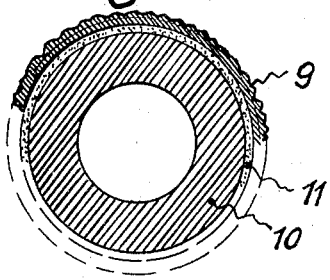

June 11, 1968   KARL-HEINZ ROOSEN   3,387,351
METHOD OF MAKING STAMPING AND EMBOSSING ROLLERS
Filed May 31, 1966

INVENTOR:
Karl-Heinz Roosen
By Walter Becker

_United States Patent Office_

3,387,351
Patented June 11, 1968

3,387,351
METHOD OF MAKING STAMPING AND
EMBOSSING ROLLERS
Karl-Heinz Roosen, Schiefbahn, Germany, assignor to
Kleinewefers Gravuren G.m.b.H., Krefeld, Germany
Filed May 31, 1966, Ser. No. 553,856
Claims priority, application Germany, May 28, 1965,
K 56,250
14 Claims. (Cl. 29—148.4)

The present invention relates to an improvement in making rollers for stamping or embossing goods and materials of various types, especially textiles, papers, wall paper, synthetic materials, and metallic foils. Rollers of this type, particularly when precision stamping is involved by means of calenders, dressing installations and the like, are almost exclusively produced by engraving or cutting by means of chip-removing tools in the following manner. First an engraver will on a small roller having a length of from 100 to 200 millimeters and a diameter of from 50 to 100 millimeters—also called molette or grooved roller—produce the positive with all details of the pattern later to be stamped. Thereupon, after the grooved roller has hardened, by means of the said grooved roller there is produced on a steel roller in actual size the negative of the stamping pattern while the roller rotates continuously over a period of weeks and is subjected to considerable pressure.

Inasmuch as the circumference of the grooved roller must be an even fraction of the circumference of the finished engraving roller, it is necessary that the marginal portions of the grooved roller during the rotation thereof smoothly merge with the adjacent rotating area, but they must also during rotation on the roller run in conformity with the pattern (Rapport).

Therefore, various efforts have been made to replace this expensive and time-consuming method requiring highly skilled workers by a less expensive and above all faster method of production. These known methods consist primarily in that either portions of a roller are produced as electrotypes or electroplates or are produced by pressing, and then the said portions are composed to a finished roller. It is also known to produce plane covers, to bend the same and then to fasten them on a roller core.

According to other heretofore known methods, seamless stamping rollers are produced in an electrolytic way, but the method is such that counter rollers for union mills can be produced only from already stamped rollers or plates. Moreover, this method is very expensive because the rollers produced in this way consist either entirely or to the major extent of metallic deposits in order to obtain the necessary strength for the counter roller. For the sake of completeness, it may be mentioned that also other methods are known for engraving by photoetching methods or by optically controlled devices.

These heretofore known methods have not proved successful in practice because the seams of the individual plates, in spite of post-working will still show up with fine goods and will not make a material difference financially.

It is, therefore, an object of the present invention to provide a method of making a cylindrical joint or seam-free stamping or embossing cover which will overcome the above mentioned drawbacks.

It is another object of this invention to provide a method of making a cylindrical seam or joint-free stamping or embossing cover which while employing the electrolytic method will be considerably less expensive and considerably faster than heretofore known methods of the general type involved.

These and other objects and advantages of the invention will appear more clearly from the following specification in connection with the accompanying drawings, in which:

FIGS. 1, 2, 4 and 5 respectively illustrate four different stages in the manufacture of the cylindrical electrotype.

FIG. 3 shows on a larger scale than FIGS. 1, 2, 4 and 5 a cross section of a portion of the cylindrical electrotype.

FIGS. 6 to 10 respectively illustrate five different phases in the manufacture of a stamping roller of synthetic material.

Figure 11:
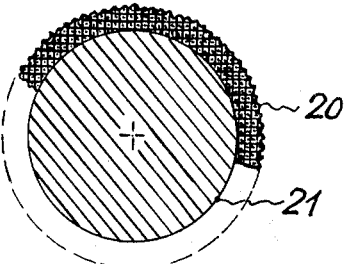

FIG. 11 is a section through a solid roller with a synthetic stamping surface.

The method according to the present invention is characterized primarily in that the relief pattern to be produced is glued to an auxiliary cylinder whereupon the joint is eliminated by aligning and equalizing. Thereupon the auxiliary cylinder with the relief layer thereon is coated by an easily soluble adhesive and with slight play is inserted in a working cylinder, and its relief layer is caused to stick to the inner wall of said working cylinder. Thereafter, the adhesive layer on the auxiliary cylinder is softened and the auxiliary cylinder is pulled out of the working cylinder. Subsequently, the free relief layer is dusted or sprayed with an electrically conductive substance and after an anode has been inserted in the interior of the working cylinder, is galvanized to a thick layer in an electrolytic bath. The thus obtained electrotype with the relief layer is withdrawn from the working cylinder, cleaned and, if necessary, equalized on the inside by grinding, and finally a closed thin-walled cylinder is placed on the roller body of the stamping roller.

According to a further development of the present invention, a free relief layer in the working cylinder is not galvanized but is coated with a pourable resin. From this negative, if desired with another pourable resin, a positive is made. From this positive, either by galvanizing or by casting with a rather hard epoxy resin, the final negative print for the roller to be made is produced. In the last instance, the roller surface to be stamped is not metallic but consists of a synthetic material which will directly carry out the stamping operation and in view of the fast and low cost method of production will have a sufficiently economical life.

The method of the present invention is particularly suitable for the reproduction of patterns as they appear in nature or on goods in the form of wide webs. Especially such patterns are, due to their irregularity and the fine details, very difficult to produce according to heretofore known methods when a true reproduction is desired, and in addition thereto require extraordinary skill. This is particularly the case when producing fabrics and knitted goods of different structure, embroideries, leather surfaces with characteristic grain, wood veneer with strong graining or surfaces representing prints or the like. However, also for regular structures and ornaments which can easily be produced by engraving and special machines (Guillochier-maschinen) or by etching, the method according to the present invention has great advantages because the engraving can now be produced on a soft base material from which an electrotype can be produced.

A further material advantage of the invention consists in that the present invention makes it possible in an inexpensive and simple manner to produce large surface patterns of the length of the circumference of a roller also in connection with stamping rollers. Inasmuch as the engraving rollers were heretofore mostly produced by rolling in by means of the small grooved rollers, the patterns could not be greater than the circumference of the grooved roller so that they had to be repeated on the circumference of the finished engraving roller, whereas, when the entire roller was engraved by hand, the costs became considerable. In this way, the selection of the patterns and the manufacturing method were limited. With the present invention, however, it is now possible to transmit not only large surface ornaments but also entire compositions or pictures which can be composed of different raster, different designs, different letter prints and drawings and raster plates and can then be transferred to a cylindrical seamless electrotype.

Referring now to the drawings in detail, FIGS. 1 to 3 illustrate how the plane relief to be transferred, for instance naps 1, are first by means of an adhesive layer 2 glued to an auxiliary cylinder 3. The joints are trimmed so that the butt is tight. The engraver now aligns offset merging portions of the threads, supplements broken-out portions by plastic or other substances and equalizes the joints so that they cannot be recognized any longer. In order to make the entire fabric resistant, it is advantageous prior to the gluing operation to permeate said fabric with a hardening impregnating substance which, however, must not be soluble in the adhesive 2 applied to the auxiliary cylinder. After in this way the positive original has been produced, the relief is again coated with another random adhesive 4 in a thick layer and is then inserted into a working cylinder 5 the inner diameter of which is so dimensioned that a slight play will exist with regard to the diameter of the original relief.

When large pore fabrics are to be transferred, as for instance a loose fabric or knitted goods, tulle, embroideries or the like, the adhesive 2 would penetrate the fabric to an undesired extent so that the stamping roller would eventually have high tips and thus would make a stamping impossible. In order to avoid this, it is suggested to cover that side of the fabric which faces the auxiliary cylinder 3, with a very thin-walled synthetic foil 6 and to cause this foil to be sucked onto said fabric by a vacuum nozzle on the back side thereof to such an extent that the foil as shown in FIG. 3 will be pressed through up to the center of the fabric layer. In this way, the adhesive layer 2 of the auxiliary cylinder as well as the adhesive layer 4 of the working cylinder are prevented from penetrating the fabric more than up to the middle thereof. The foil will be withdrawn after removal of the auxiliary cylinder but prior to the electrolyzing operation. The separating plane between the two adhesive layers will then during the stamping of the goods form the foundation of the stamping pattern which foundation will show a smooth surface in view of the employed foil.

According to a further development of the present invention, the adhesive layer 4 has added thereto a high percentage of a more or less fine granulate as for instance quartz powder, and sand or small metallic balls in order to assure that the foundation will have a surface structure corresponding to the character of the stamping pattern.

FIG. 2 illustrates a cross section through a pressure hose 7 serving as an auxiliary device. By introducing compressed air into hose 7, the original pattern will evenly press at all areas against the inner surface of a working cylinder. During this operation, the auxiliary cylinder 3 must stretch somewhat which can easily be realized if the wall thickness is not too great and a corresponding pressure is applied.

After the adhesive has solidified, the adhesive 2 between the original relief and the auxiliary cylinder is by means of a solvent or by the effect of heat dissolved, and the auxiliary cylinder is withdrawn. In order to facilitate this working operation, the auxiliary cylinder is advantageously made of a resistant perforated sheet metal which may additionally be covered by a metallic fabric or the like. In this way, the solvent introduced into the cylinder will be able quickly and uniformly to penetrate the cylinder wall and to dissolve the adhesive.

After the auxiliary cylinder 3 has been removed, the inner surface of the working cylinder 5 will show the positive original relief glued onto cylinder 5. After cleaning and drying, the said relief is sprayed or dusted with an electrically conductive substance or is steamed in a vacuum. Thereupon, as shown in FIG. 4 the working cylinder 5 is introduced into an electrolytic bath and by means of a centrically arranged anode 8 a uniformly distributed metallic deposit 9 is produced on said relief. The thickness of said deposit may be selected in conformity with the stress involved and the type of material. If now this cylindrical seamless electrotype 9 is withdrawn by spreading the working cylinder, and when the adhesive 4 with the fabric 1 is removed, the surface of said electrotype will show the negative of the original relief which later by placing on a steel roller will bring about the engraving.

The loosening of the cylindrical electrotype from the working cylinder may be effected in a way similar to that employed in connection with the auxiliary cylinder, inasmuch as the working cylinder is provided with perforations through which the solvent softening the adhesive can enter, or by dissolving the adhesive by the application of heat. Additionally, it is suggested according to the present invention, to provide the working cylinder with a separating gap which after completion of the electrotype can be spread whereby the inner diameter of the working cylinder will be somewhat enlarged.

After the electrotype 9 has been withdrawn from the working cylinder, the original relief is removed by deterioration whereby after grinding off any irregularities in the interior of said electrotype, the latter will in conformity with FIG. 5 be placed on a steel roller 10. Advantageously, the connection of the electrotype onto roller 10 may be effected by soft soldering while the roller diameter is to be so selected that between the electrotype and the roller surface there will remain a small gap 11 in order to aid the flow of the solder. Additionally, a centering may be effected by passing through the gap thin wires at various points. According to another method which is equally favorable, the connection may also be effected by means of hardening synthetic materials which are poured into the gap in liquid condition. As such synthetic material may be employed for instance epoxy resin or loctite.

The production of the stamping surface of the stamping roller is not limited to the electrolytic transfer method. Thus, a stamping negative can also be produced from an original relief by molding the stamping negative therefrom by means of a plastic synthetic material which advantageously hardens after a short while. As synthetic material for the negative and positive prints are particularly suitable synthetic polysiloxane rubber materials with and without fillers which after the addition of hardeners will interlink already at room temperature and which in view of the fact that they are thin flowing will be able to print even the finest fibers or details of an original even if several intermediate transfers are employed. For the manufacture of negative printing surfaces, synthetic materials with a higher degree of hardness are employed primarily duroplastic materials as for instance epoxy resins. According to a further development of the present invention, also the printing surfaces of synthetic material can be made wear-resistant by a metallic coat or cover for instance by hard chroming. The multiplication and manufacture of a negative while employing the above mentioned synthetic resins is expediently effected in the following manner as will be set forth in connection with FIGS. 6 to 11.

Figure 7:
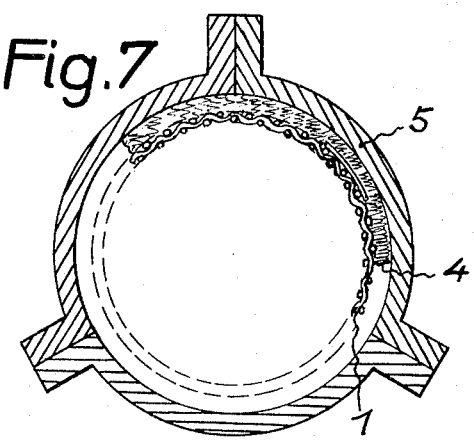
Figure 8:
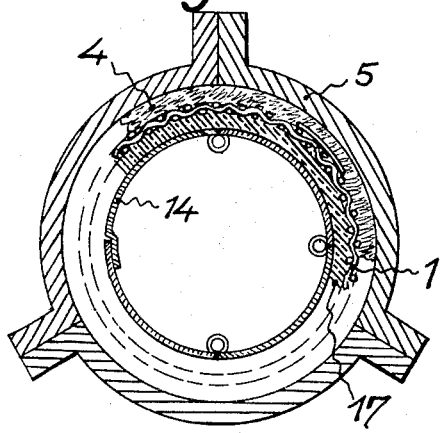
Figure 9:
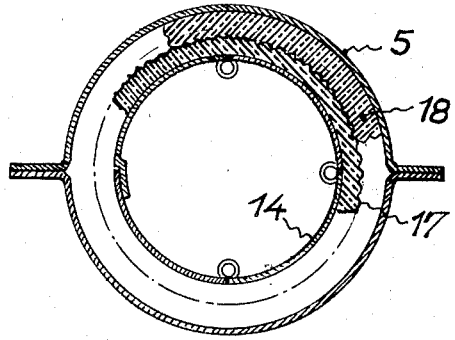

Similar to the embodiment of FIG. 1, the original relief 1, for instance a fabric, is again first placed on an auxiliary cylinder 12 this time, however, without gluing thereto. The auxiliary cylinder, therefore, may be solid and in the illustrated example comprises a plurality of wooden profiles 12 which together with a central spreading section 13 form a cylinder. The clean repaired original piece is at its joint 15 so aligned that any irregularity will not be recognizable any longer whereupon the relief is held together by an adhesive strip 16 glued thereon. Subsequently, as illustrated in FIG. 7, the mounted relief is now covered with an adhesive layer 4 and is enveloped by a multi-sectional working cylinder 5. Following the drying of the adhesive, the auxiliary cylinder 12 can be removed by pulling the spreading section 13 whereupon the inwardly directed surface of the original relief is exposed.

From the positive surface of the original relief 1 there is now separated a negative while employing the above mentioned synthetic rubber. This is effected in conformity with FIG. 8 by again arranging an auxiliary cylinder 14 coaxially within working cylinder 5 and filling the space between said cylinder 5 and the relief cylinder with a hardenable synthetic rubber 17 of the described type. After this rubber material has hardened, the working cylinder 5 with the original relief 1 is removed and the exposed auxiliary cylinder 14 with the negative print 17 of the original is again surrounded by a working cylinder 5 and the space therebetween is advantageously filled with a similar synthetic material as it was employed for the layer 17. In order to prevent a sticking or connection of the two employed layers, it is necessary to spray layer 17 prior to the pouring operation with a separating substance as for instance a wax or silicone solution. As a specific solution for this purpose may be employed for instance "release agent W 10," consisting of hard wax and other components (made by Chemische Fabrik Dr. Herbert Wolff & Co., Hamburg-Eidelstedt 1).

After the auxiliary cylinder 14 has been removed (by folding the shelves) together with the negative layer 17, within the working cylinder 5 there is obtained a positive duplicate of the original relief, this time of synthetic material. From this positive, it is now possible similar to the above mentioned method, electrolytically or by printing with a synthetic material to produce the negative to be used for the stamping roller. In the last mentioned instance a very hard synthetic material is employed namely the above mentioned epoxy resin which after the addition of a hardener is filled into the space between a steel sleeve 19 and the positive 18 (see FIG. 10). After the working cylinder 5 has cooled off, the latter is removed together with the positive 18 whereupon the negative of synthetic material with the steel sleeve is so connected to a stamping roller body as has been described in connection with FIG. 5.

Figure 10:
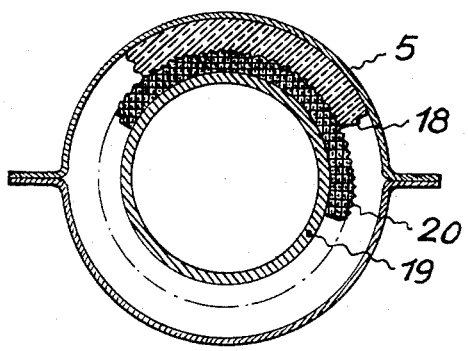

The method according to the invention may furthermore be modified so that either in the stage of FIG. 7 or in the phase of FIG. 10 the stamping roller body 21 is in spaced relationship inserted into the working cylinder with the original relief or with the positive print 18 of the stamping roller body 21, and the epoxy resin is directly poured around the roller body as shown in FIG. 11. Which method is to be given preference will depend in part on the available means of operation and in part on the type and fineness of the relief structure or other requirements.

The method according to the present invention makes it possible to produce engraving rollers with various designs and foundation rasters at a minimum of costs and within a time which amounts to a fraction only of the time heretofore required for grooved rollers.

It is, of course, to be understood that the present invention is, by no means, limited to the particular methods and devices set forth above, but also comprises any modifications within the scope of the appended claims. Thus, the auxiliary and working cylinders in addition to being made of solid metals may also be made of other materials as for instance wire screens, polyamide fabrics, sintered metals, wood, sheet metal or porous ceramics. Also for the cylindrical electrolyte various substances may be employed as for instance very hard metals or metallic alloys or the stamping surface may be hard chromed for the elecrolytes as well as for synthetic stamping rollers.

What is claimed is:

1. A method of making engraving rollers for simulated relief patterns on material such as textiles, paper, synthetics, metal foil and the like which comprises; wrapping a member having the pattern to be printed in relief thereon into the form of a cylinder so the edges of the member are substantially abutting and with the side of said member which is to form the pattern on the inside, supporting the now cylindrical member from the inside while substantially eliminating evidence of the joint where the edges of the member abut, supporting the cylindrical member from the outside while it is supported from the inside, removing the support from the inside thereof to expose the inside of said cylindrical member while the member remains supported from the outside, and reproducing in reverse the relief pattern exposed on the inside of the cylindrical member on a hard cover sleeve adapted for mounting on the body of an engraving roll to provide the sleeve surface with a relief pattern which is complementary to the exposed inside surface of said cylindrical member.

2. The method according to claim 1, in which the inside surface of said cylindrical member is provided with an electrically conductive coating, and said cover sleeve is formed by electroplating a tubular metal layer on said inside surface of said cylindrical member, removing the metal layer and member from the outer support for the member, and removing the member from the metal layer to expose the surface of the metal layer.

3. The method according to claim 1, in which said cylindrical member is supported from the inside by an auxiliary cylinder inserted therein and connected thereto by a first adhesive and is supported from the outside by a working cylinder in which the cylindrical member is placed while on said auxiliary cylinder and to which working cylinder the cylindrical member is connected by a second adhesive, said adhesives being removable independently of each other.

4. The method according to claim 3, in which a layer of moisture impervious foil is applied to the inside surface of said cylindrical member between the said surface and the adhesive pertaining thereto and is removed prior to reproduction of the pattern of said surface.

5. The method according to claim 1, in which the abutting edges of said cylindrical member are adhesively interconnected on the outside of the member and the member is supported from the inside by inserting an expansible auxiliary cylinder therein and expanding the auxiliary cylinder inside said member into supporting engagement therewith.

6. The method according to claim 3, in which a hardening agent is placed on said cylindrical member prior to the application of adhesive thereto which agent is insensitive to the solvents in said adhesives.

7. The method according to claim 2, in which said cover sleeve is soldered to an engraving roller body.

8. The method according to claim 2, in which said cover sleeve is secured to an engraving roller body by a resistant duroplastic material.

9. The method according to claim 8, in which said cover sleeve is centered on said body by wires inserted between the cover sleeve and the body.

10. The method according to claim 1, in which a layer of hardenable synthetic material is applied to the exposed inside surface of said cylindrical member while it is supported from the outside to take a negative impression of the inside of said member, and utilizing the impression so taken as a mold to form the pattern on the surface of said cover sleeve.

11. The method according to claim 10, in which a positive impression is taken from said negative impression and a tube of very hard synthetic material is cast therein to make the said cover sleeve.

12. The method according to claim 10, in which a positive impression is taken from said negative impression and a molding space is formed by placing a cylinder having the same outer diameter as the engraving roller body in said positive impressing coaxially therewith, and casting a very hard synthetic material in said molding space to form said cover sleeve.

13. The method according to claim 4, in which said member is a relatively open mesh fabric and said foil is vacuum formed into about the central plane of the fabric in the spaces between the threads of said fabric so as to form a stop for said second adhesive so the second adhesive will form the surface corresponding to the peaks of the pattern on the cover sleeve when said foil is removed from said member.

14. The method according to claim 13, in which said second adhesive has solid bodies admixed therewith to form a desired configuration for said peaks.

References Cited
UNITED STATES PATENTS

| | | | |
|---|---|---|---|
| 3,018,540 | 1/1962 | Chavannes | 29—148.4 |
| 3,081,495 | 3/1963 | Kovatch | 264—220 |
| 3,226,800 | 1/1966 | Fenlason | 29—148.4 |

THOMAS H. EAGER, *Primary Examiner.*